US 8,135,761 B2

(12) United States Patent
Watson et al.

(10) Patent No.: US 8,135,761 B2
(45) Date of Patent: *Mar. 13, 2012

(54) SYSTEM AND METHOD FOR AUTOMATICALLY CREATING A MEDIA ARCHIVE FROM CONTENT ON A RECORDING MEDIUM

(75) Inventors: David J. Watson, Seattle, WA (US);
John Moore, Redmond, WA (US);
Philip L. Barrett, Shoreline, WA (US);
Nicole A. Hamilton, Redmond, WA (US)

(73) Assignee: RealNetworks, Inc., Seattle, WA (US)

( * ) Notice: Subject to any disclaimer, the term of this patent is extended or adjusted under 35 U.S.C. 154(b) by 219 days.

This patent is subject to a terminal disclaimer.

(21) Appl. No.: 12/332,110

(22) Filed: Dec. 10, 2008

(65) Prior Publication Data
US 2009/0150409 A1    Jun. 11, 2009

Related U.S. Application Data

(60) Provisional application No. 61/012,500, filed on Dec. 10, 2007, provisional application No. 61/073,794, filed on Jun. 19, 2008, provisional application No. 61/095,249, filed on Sep. 8, 2008.

(51) Int. Cl.
*G06F 17/30* (2006.01)
(52) U.S. Cl. ........................................ 707/821
(58) Field of Classification Search .............. None
See application file for complete search history.

(56) References Cited

U.S. PATENT DOCUMENTS

| 6,069,952 | A | 5/2000 | Saito et al. |
| 2002/0051494 | A1* | 5/2002 | Yamaguchi et al. ...... 375/240.16 |
| 2003/0158861 | A1* | 8/2003 | Sawdon et al. ............... 707/200 |
| 2003/0163823 | A1* | 8/2003 | Logan et al. .................... 725/89 |
| 2004/0022521 | A1 | 2/2004 | Kishi et al. |
| 2005/0152675 | A1 | 7/2005 | Hanes |
| 2005/0169467 | A1 | 8/2005 | Risan et al. |
| 2005/0226320 | A1* | 10/2005 | Lambert et al. .......... 375/240.02 |
| 2005/0232577 | A1 | 10/2005 | Green |
| 2006/0064716 | A1 | 3/2006 | Sull et al. |
| 2006/0114787 | A1 | 6/2006 | Festal et al. |
| 2006/0195909 | A1 | 8/2006 | Boswell et al. |

(Continued)

FOREIGN PATENT DOCUMENTS
WO    WO2009154948 A1    12/2009
(Continued)

OTHER PUBLICATIONS

Office Action mailed Oct. 5, 2011, for U.S. Appl. No. 12/332,121, filed Dec. 10, 2008.

*Primary Examiner* — Neveen Abel Jalil
*Assistant Examiner* — Kellye Buckingham
(74) *Attorney, Agent, or Firm* — Kory D. Christensen; Stoel Rives LLP

(57) ABSTRACT

A media player for creating a media archive may include a media reader to read media content from a recording medium inserted into the media reader. The media player may also include an archival component to store the media content in a storage medium. In one embodiment, the media player includes a playback component to play back the media content from the storage medium concurrently with the storage of the media content by the archival component.

27 Claims, 9 Drawing Sheets

U.S. PATENT DOCUMENTS

| | | |
|---|---|---|
| 2007/0053513 A1 | 3/2007 | Hoffberg |
| 2007/0061364 A1* | 3/2007 | Klein .................... 707/104.1 |
| 2007/0079145 A1 | 4/2007 | Saito |
| 2007/0239699 A1* | 10/2007 | Murrells et al. ............... 707/4 |
| 2007/0257247 A1 | 11/2007 | Ando et al. |
| 2007/0299873 A1 | 12/2007 | Jones et al. |
| 2008/0095339 A1 | 4/2008 | Elliott et al. |
| 2008/0141133 A1 | 6/2008 | Yamamoto et al. |
| 2009/0080870 A1* | 3/2009 | Mudie et al. ................ 386/131 |
| 2009/0148125 A1 | 6/2009 | Watson et al. |
| 2009/0319807 A1 | 12/2009 | Chasen et al. |

FOREIGN PATENT DOCUMENTS

| | | |
|---|---|---|
| WO | WO2009155205 A1 | 12/2009 |

* cited by examiner

SYSTEM AND METHOD FOR AUTOMATICALLY CREATING A MEDIA ARCHIVE FROM CONTENT ON A RECORDING MEDIUM

CROSS-REFERENCE TO RELATED APPLICATIONS

This application claims the benefit of U.S. Provisional Application No. 61/012,500, filed Dec. 10, 2007, for "Video Player," which is incorporated herein by reference in its entirety. This application also claims the benefit of U.S. Provisional Application No. 61/073,794, filed Jun. 19, 2008, for "Video Player," which is likewise incorporated herein by reference in its entirety. This application also claims the benefit of U.S. Provisional Application No. 61/095,249, filed Sep. 8, 2008 for "Systems and Methods for Content Playback and Recording," which is likewise incorporated hereby by reference in its entirety.

TECHNICAL FIELD

The present disclosure relates to media playback and recording.

DETAILED DESCRIPTION

Figure 1:
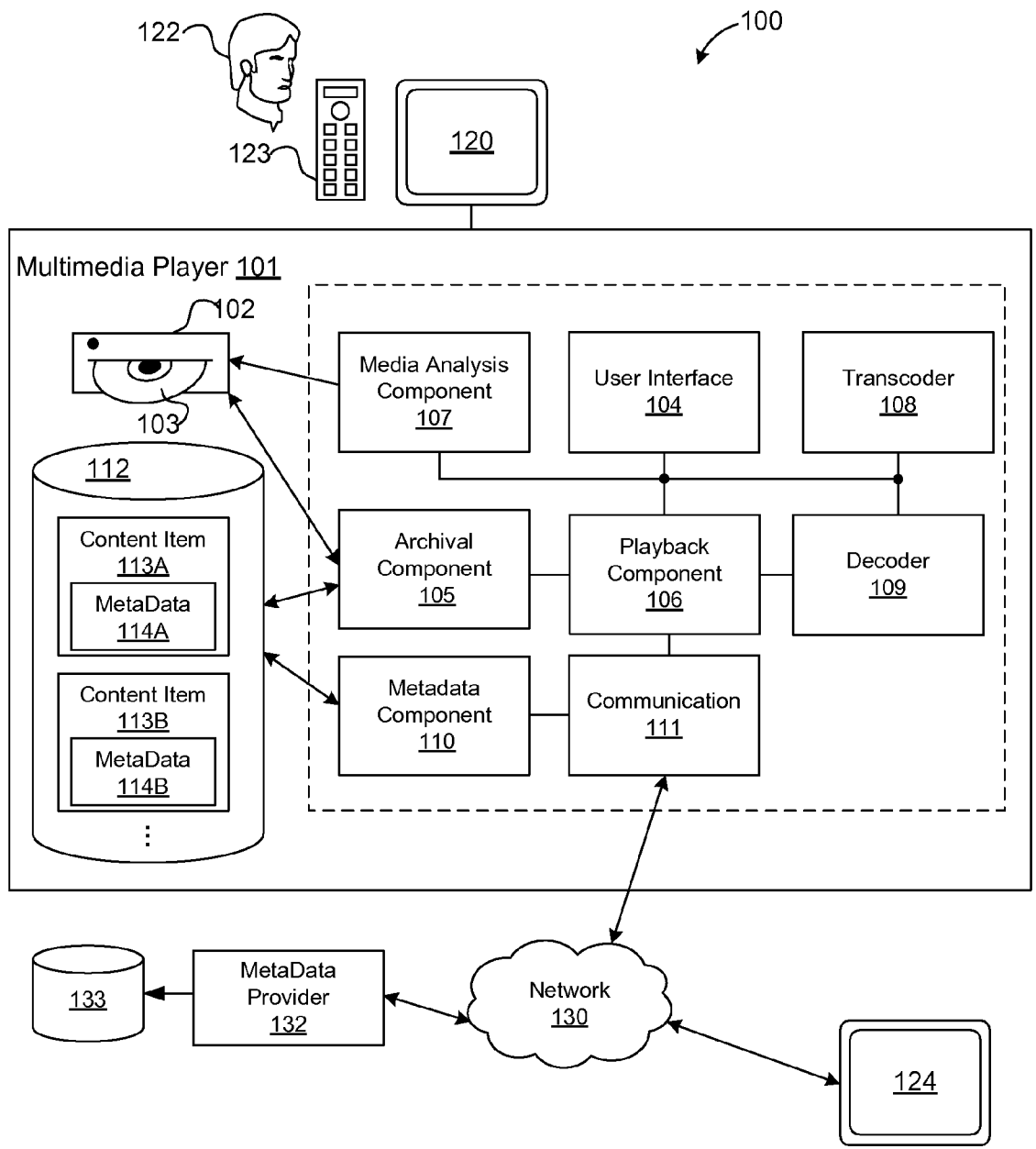
FIG. 1 is a block diagram of a system for automatically creating a media archive from content on recording medium.

FIG. 1 is a block diagram of a system 100 for automatically creating a media archive from content stored on a recording medium 103. In one embodiment, a user is not required to explicitly instruct the system 100 to create the media archive other than to initiate playback of the content (or to simply insert the recording medium). Subsequently, the user may view the media content directly from a media archive without having to use the recording medium.

In one embodiment, the system 100 includes a media player 101. The media player 101 may include a media reader 102 capable of reading media content (e.g., movies, television shows, audio recordings, games, etc.) from a recording medium 103, examples of which may include digital versatile discs (DVDs), Blu-Ray® discs, compact discs (CDs), solid-state memory devices, Flash memory devices, or the like. The media player 101 may also include a user interface component 104, an archival component 105, a media playback component 106, a media analysis component 107, a transcoder 108, a decoder 109, a metadata component 110, and a communication module 111. The media player 101 may further include a computer-readable storage medium 112, which may include one or more archived media content items (e.g., content items 113A and 113B). Each of the components 104-112 is described in greater detail below.

The components 104, 105, 106, 107, 108, 109, and/or 110 may be implemented as computer-readable instructions executable by a general purpose processor, such as a Core™ 2 Duo processor from Intel®, an Athlon™ processor from Advanced Micro Devices (AMD), or the like, and/or a special purpose processor, such as an Application Specific Integrated Circuit (ASIC), a Field Programmable Gate Array (FPGA), or the like. In some embodiments, the components 104, 105, 106, 107, 108, 109, and/or 110 may be implemented using a combination of processors, such as a general purpose and a special purpose processor. Similarly, one or more of the components 104, 105, 106, 107, 108, 109, and/or 110 may include dedicated hardware components. For example, the decoder 109 may include decoder hardware controlled by instructions executing on a general purpose processor.

The media player 101 may be coupled to a display 120, such as a television, computer monitor, a PDA/smart phone display, etc., using one or more standard video connections, e.g., High-Definition Media Interface (HDMI), Radio Frequency (RF) coaxial, composite video, S-video, Digital Visual Interface (DVI), Video Graphics Array (VGA), or the like. The display 120 may present media content to a user 122, who may control the operation of the display 120 and/or media player 101 using a remote control 124. Alternatively, or in addition, the media player 101 may be communicatively coupled to a remote display 124 via a network 130. In such an embodiment, the media player 101 may be configured to stream media content to the remote display 124 over the network 130.

The media player 101 may include one or more inputs (not shown) to allow the user 122 to control the operation of the media player 101. Alternatively, or in addition, the user 122 may control the operation of the media player 101 using a remote control device 123. The user interface component 104 of the media player 101 may present controls, status information, and other interface components on the display 120 and/or the remote display 124. The user 122 may interact with the user interface presented by the user interface component 104 to view the status of the media player 101 and/or control its operation.

As will be described in additional detail below, an archival component 105 of the media player 101 may be configured to archive at least a portion of the media content on the recording medium 130 on the computer-readable storage medium 112. FIG. 1 shows examples of archived content items 113A and 113B.

In one embodiment, the media content on the recording medium 103 may be concurrently archived by the archival component 105 and played back by the playback component 106 e.g., in a single "play and save" operation. As such, the user interface component 104 may provide a "play and save" user interface input element. Selection of the play and save input by a user 122 may cause the archival component 105 to begin archiving and playing the media content on the recording medium 103.

Alternatively, or in addition, the archival may commence as soon as the recording medium 103 is made available to the media player 101. For example, the archival component 105 may begin archiving a recording medium 103 as soon as the medium 103, such as a DVD disc, is inserted into the media reader 102.

As shown in FIG. 1, the storage medium 112 may store one or more archived media content items (e.g., content items 113A-113B). The storage medium 112 may include, but is not limited to one or more hard discs (e.g., discs comprising magnetic storage medium), optical media, volatile memory, non-volatile memory, Flash memory, or the like. In some embodiments, portions of the storage medium 112 may be disposed within the media player 101 and other portions of the storage medium 112 may be disposed externally of the media player 101. The portions of the storage medium 112 disposed outside of the media player 101 may be communicatively coupled to the media player 101 via a Universal Serial Bus (USB) connection, an IEEE 1394 (Firewire®) connection, a network connection, or the like. In some embodiments, the storage medium 112 may include a plurality of storage devices, such as a Redundant Array of Inexpensive Discs (RAID), a storage area network (SAN), a network-attached storage (NAS), a cluster, or other data storage configuration. Similarly, portions of the storage medium 112 may be removable from the media player 101. For example, discs may be swapped into and out of the media player 101, flash or other memory types may be inserted and/or removed from the media player 101, and so on.

After the multimedia content on the recording medium 103 is archived in the storage medium 112 (e.g., content items 113A and 113B), the content may be played by the playback component 106 of the media player 101 without requiring the recording medium 103 to be inserted into the player 101. Similarly, the playback component 106 may play media content from the storage medium 112 as it is archived by the archival component 105 (e.g., concurrently with archiving the media content 103). Collectively, the stored content items 113A and 113B are referred to herein as a content "archive" or "library."

As an example, a user may have a DVD movie collection including dozens or even hundreds of DVDs. As each DVD movie is played in the media player 101, a backup or archive of the movie may be stored on the storage medium 112. Archival may take place upon insertion of the recording medium 103 into the media reader 102 or in response to a single command to play and save the recording medium 103 received via the user interface component 104 (e.g., via a "play and save" user interface element). Once the contents of the DVDs have been added to the media archive, subsequent playback using the playback component 106 may occur without having to handle the recording medium 103. In this way, a media archive may be automatically created as one or more users of the media player 101 play various recording media (e.g., such as the recording medium 103), without requiring the one or more users to perform a dedicated archiving step.

In some embodiments, the media analysis component 107 of the media player 101 may be configured to analyze the recording medium 103 as the recording medium 103 is archived in the storage medium 112. The media analysis component 107 may allow the media player 101 to determine the structure of the media on the recording medium 103. For example, a DVD movie stored on the recording medium 103 (e.g., a DVD movie disc) may include various segments, such as one or more previews, one or more special features, one or more menus, the movie itself (e.g., comprising one or more "chapters"), and so on. The media analysis component 107 may identify each segment on the recording medium 103. The data describing the structure of the recording medium 103 may be stored in the storage medium 113 in association with its respective content item (e.g., content item 113A-113B). The data describing the structure of the content item ("content item structure data") may include a map relating the content item features (e.g., preview, menu, and so on) to locations within the content item.

Using the content item structure information, the media player 101 may allow the user 122 to skip to any portion or segment of a content item. For example, the user 122 may direct the media player 101 (e.g., via a user interface presented by the user interface component 104) to immediately begin playing a particular chapter of an archived DVD movie, skipping the previews, menu, and the like.

The content item structure data may further include one or more user-defined bookmarks. The user-defined bookmarks may point to arbitrary positions within a content item. For example, the user 122 (through the user interface component 104) may cause the media player 101 to create a bookmark to a particular portion of an archived DVD movie. This may allow the user to return to the bookmark without navigating through the DVD chapter menu or the like. The content item structure information, including any user-defined bookmarks, may be stored as content item metadata (e.g., metadata 114A and 114B) within the storage medium 112.

The media analysis component 107 may also be used to detect and/or avoid media obfuscation schemes. The recording medium 103 may include obfuscated data. Such obfuscation data may include one or more "bad sectors" on the recording medium 103, which may cause a sequential archival of the recording medium 103 to fail. For instance, the obfuscation sectors may be linked together in an infinite loop and/or the sectors may be configured to intentionally cause read failures and/or timeouts. Successive timeouts and/or read failures due to the bad sectors may cause an archiving process to fail and/or take an inordinate amount of time (in the case of an infinite loop, the archival may never complete).

The media analysis component 107 may be used to analyze the recording medium 103 (e.g., "walk" the recording medium 103) to determine the valid portions thereof. The media analysis component 107 may execute virtual machine instructions to allow the media analysis component 107 to emulate the operation of a standard media player (e.g., a normal DVD player). During a walk operation, the media analysis component 107 may access the recording medium 103 from its beginning (e.g., at the "first-play" program chain). The walk may follow the program chain as a standard media player would until a branch or other terminator is reached. In some cases, the media data read from the recording medium during the walk process may be discarded as quickly as possible. This may allow the media analysis component 107 to quickly walk the recording medium 103. Alternatively, the media analysis component 107 may read the media data from the recording medium 103 for archival by the archival component 105.

When the walk process reaches a branching point (e.g., menu), the media analysis component 107 may store a record of both its current state and the state after following each branch (e.g., each menu option). The current state and branch state may be stored in a media walk data structure (e.g., a stack), which may be used to determine which portions of the recording medium 103 have been visited by the walk process. A branch may be implemented as DVD instructions interpretable by the virtual machine emulator of the media analysis component 107. The media analysis component 107 may follow each branch to thereby determine whether the branch represents valid data.

Alternatively, or in addition, before following a branch and/or adding the branch state to a media walk data structure, the media analysis component 107 may determine whether the branch is likely to lead to valid data. For example, if a branch is reachable by an "invalid" menu option, the portion of the recording medium 103 corresponding to the branch (and data on the recording medium 103 associated therewith) may be marked as "bad" and ignored. The media analysis component 107 may detect invalid menu options in a number of different ways. For example, a menu option that falls outside of the viewable area of a display, is "invisible," is very small, is displayed for only a few frames, or the like, the media analysis component 107 may be considered an invalid menu option. However, other invalid menu item detection techniques could be used according to the nature of the obfuscation scheme in use on the recording medium 103.

The current state of the media walker and the state of the walker after following any of the links may be stored in a media walker data structure (e.g., on a stack-type data structure). The media analysis component 107 may walk each branch of the recording medium 103 in the data structure as described above. Subsequent branches may be similarly evaluated and/or followed as described above. Upon reaching the end of a branch segment, the media analysis component may recursively traverse any remaining branches in the media walker data structure. If a branch leads to bad sectors, is circular (links back to an area of the disc already visited by the walk process), is an infinite still frame, is unreachable by other portions of the DVD, or the like, the branch (and portions on the recording medium 103 associated therewith) may be marked as "bad." The branch evaluation and walking process may continue until all valid sectors on the recording medium 103 have been identified (e.g., until all branches on the recording medium 103 have been evaluated and/or walked). The result of the walk operation may be a graph data structure of the recording medium 103 comprising the valid branches and/or sectors thereon.

The walk process of the media analysis component 107 may be performed concurrently with archival and/or playback of the recording medium 103. As such, the media analysis component 107 may communicate with the archival component 105 and/or playback component 106 to synchronize the walk operation such that the portions of the recording medium 103 read by the media analysis component 107 correspond to the portions requested by the archival and/or playback components 107 and 108. Similarly, the operation of the components 104, 107, and 108 may be synchronized to minimize disc seeking. In this way, the media analysis component 107 may analyze the structure of the recording medium 103 without disrupting archival and/or playback of the recording medium 103.

The storage medium 112 may have sufficient storage space to hold a particular amount of media content (e.g., a particular number of DVD movies or the like). For example, the storage medium 112 may have sufficient storage capacity to allow for the storage of twenty (20) to one hundred (100) movies. In some embodiments, however, the storage medium 112 may be expandable with additional internal and/or external storage to allow the media player 101 to hold an arbitrary amount of media content.

In some embodiments, the media storage capacity of the storage medium 112 may be increased by compressing the media content stored thereon. Video and/or audio content items on the recording medium 103 may be encoded in a first encoding format. For example, DVD movies on a DVD disc recording medium 103 may be encoded in the Motion Picture Experts Group 2 (MPEG-2) format. In addition, the DVD movie content may be encrypted (e.g., scrambled) using an encryption scheme, such as Content Scramble System (CSS), Data Encryption Standard (DES), Blowfish, or the like. The encryption may serve a digital rights management (DRM) function to prevent unauthorized replication and/or playback of the content on the recording medium 103.

In one embodiment, the media player 101 is configured to re-encode content read from the recording medium 103 as it is archived on the storage medium 112. For example, content originally encoded in the MPEG-2 format may be transcoded into a second (different) format, such as H.264, VC-1, RealVideo®, or the like. The transcoding may be performed in real-time or at such times as the media player 101 is not performing other tasks. Similarly, the media player 101 may be configured to decrypt (e.g., unscramble) content on the recording medium 103. The decrypted and/or transcoded content may be stored on the storage medium 112 and/or made available for display (e.g., on the display 120 and/or the remote display 124).

As described above, the decryption and/or transcoding operations of the transcoder may be implemented using a general purpose processor, special purpose processor, and/or one or more special purpose hardware components.

The transcoder 108 may be configured to re-encode content items (e.g., content items 112A and/or 112B) according to various different encoding formats. Alternatively, or in addition, the transcoder 108 may be configured to automatically transcode content read from the recording medium 103 as it is read by the media reader 102.

As an example, the storage medium 112 of FIG. 1 includes content items 113A and 113B, each of which may have been encoded using MPEG-2, a relatively inefficient encoding format. In one embodiment, the content items 113A and 113B may be re-encoded using H.264, which produces substantially smaller files while preserving the same quality. As a result, the storage medium 112 may hold additional content items. Similarly, the recording medium 103 may include content encoded in the MPEG-2 format. As the archival component 105 stores the media content in the storage medium 112, the transcoder 108 may automatically transcode the media (e.g., into H.264, or another encoding format).

In addition to improving storage utilization, content may be transcoded from formats for which direct hardware decoding is not readily available. For instance, the decoder 109 of the media player 101 may be configured to decode one or more media encoding formats. As discussed above, the decoder 109 may include computer-readable instructions executable by a general or special purpose processor and/or may comprise one or more hardware components.

However, the recording medium 103 and/or content items stored on the storage medium 112 may be encoded in a format that is not supported by the decoder 109, such as content encoded using Microsoft's Windows Media Video (WMV) encoding format. As such, in order to play back the content, the media player 101 may have to decode the WMV content using a software decoding process (e.g., on a general purpose processor (not shown)), which may be computationally expensive and, in some cases, may produce sub-par results. Accordingly, the transcoder 108 may be configured to transcode the content into a format that is decodable by the decoder 109. This may allow the media player 101 to leverage the software and/or hardware decoding resources available on the media player 101 to provide for efficient, high-performance content playback.

Similarly, in some embodiments, the media player 101 may be configured to transmit media content to a remote display, such as the remote display 124. The remote display 124 may be communicatively coupled to the media player 101 via a network 130. The network 130 may include any communications network known in the art including, but not limited to a Transmission Control/Internet Protocol (TC/IP) network, a wireless network (e.g., IEEE 802.1a-n network, Bluetooth®, or the like), a cellular network (e.g., a 3G network or the like), a Local Area Network (LAN), a Wide Area Network (WAN), the Internet, or the like. The media player 101 may include a communications module 111 which may be configured to communicatively couple the media player 101 to the network 130. Accordingly, the communications module 111 may include one or more communications interfaces, such as an Ethernet® communications interface, a wireless network interface, a Bluetooth® interface, a cellular telephone interface, a Public Switched Telephone Network (PSTN) interface, or the like.

The transmission of content from the media player 101 to the remote display 124 may include streaming the content to the remote display 124 over the network 130. The transcoder 108 may be configured to transcode media content read from the recording medium 103 and/or stored in the storage medium 112 into a format suitable for transmission to and/or display on the remote display 124. For example, video content encoded using MPEG-2 may be transcoded into a RealVideo® stream, which may be efficiently transmitted to the remote display 124 via the network 130. The nature of the transcoding may depend upon the bandwidth available to the media player 101 and the remote display 124 and/or the capabilities of the remote display 124. For instance, the remote display may include one or more decoders capable of decoding media content in a particular encoding format. The media player 101 may be configured to determine which formats are supported and/or preferred by the remote display 124 and to transcode the media content transmitted to the remote display 124 accordingly.

As discussed above, the transcoder 108 may transcode media content as it is read from the recording medium 103 and/or after archiving the media content on the storage medium 112. The transcoder 108 may transcode code media content for various purposes including, but not limited to decrypting (e.g., unscrambling) the media content, compressing the media content (e.g., to increase the virtual storage capacity of the storage medium 112), transcoding the content into a format for which hardware decoding is available (e.g., into a format adapted for the decoder 109), transcoding the media content into a streamable format, transcoding the media content into a format suitable for display on a remote display device, such as the remote display 124, or the like.

As discussed above, the user interface component 104 of the media player 101 may allow the user 122 to control the operation of the media player 101. Control instructions may be received via a remote control device 104 and/or via one or more interfaces on the media player 101 (e.g., controls disposed on the player 101, such as buttons, toggles, and the like) and/or controls presented on the display 120. For instance, the display 120 may be a touch screen display. The media player 101 may cause one or more control interfaces to be presented on the display 120 to allow the user 122 to control the operation of the media player 101.

The user interface component 104 may provide a "play and save" input. Selection of the "play and save" input may cause the media player 101 to archive the media content on the recording medium 103 while playing back the media content on the display 120 and/or remote display 124. As such, the recording medium 103 may be concurrently archived and played by invoking a single command. Alternatively, or in addition, the media player 101 may be configured to begin archiving the recording medium 103 upon detecting insertion of the recording medium 103 into the media reader 102.

As discussed above, the media player 101 may be configured to display media content stored on the recording medium 103 while concurrently storing the media content in the storage medium 112. In this way, an archive or library of stored content items (e.g., content items 113A-113B) may be created while the user 122 views the content. Accordingly, the user 122 need not archive the media content in a separate step (e.g., the user 122 need not separately archive and view the content items 113A-113B since the content items 113A-113B are stored as the user views the respective content items). Similarly, a user 122 may archive the media content on a recording medium 103, while playing back archived media content (e.g., content items 113A or 113B).

The media reader 102 may be capable of reading the recording medium 103 faster than the normal playback speed. For instance, the recording medium reader 102 may be capable of reading data from the recording medium 103 at 4× to 16×, i.e., four (4) or sixteen (16) times playback speed. Accordingly, the media player 101 may be capable of archiving the media content on the recording medium 103 before the user 122 is finished viewing the content item. In such an embodiment, the playback component 107 may be configured to play media content read from the storage medium 112 rather than from the recording medium 103 directly.

The user interface component 104 of the media player 101 may include controls to allow the user 122 to control the playback of the media content. For example, as the media player 101 concurrently plays back and archives media content on a recording medium 103, the user 122 may instruct the player 101 to navigate to a different location within the content (e.g., fast forward within the content, jump a particular chapter or section, or the like).

These instructions may be received before all of the media content has been archived on the storage medium 122. When the media player 101 receives such a navigation instruction, the player 101 may determine whether the requested content has been stored on the storage medium 122. If the media content is not yet available on the storage medium 122, the archival component 105 may "skip" to the requested location and to continue archiving the media. This may allow the playback component 106 to play the media at the requested location (e.g., by reading the requested location within the media content from the storage medium 112). If the requested media content has already been archived, the playback component 106 may obtain the requested content from the storage medium 112 and display the content for the user 122.

To track which portions of the media content on the recording medium 103 have been archived (e.g., stored on the storage medium 112), the archival component 105 may maintain a data allocation map (DAM) associated with the media content on the recording medium 103. In some embodiments, the DAM may include a table-like data structure comprising a list of sectors on the recording medium (or other delimiters, such as cells, nodes, or the like) with respective, corresponding indications a status of the portion of the recording medium. The status may indicate whether the portion of the recording medium 103 has not yet been accessed; whether the portion of the recording medium 103 has been archived (e.g., stored in the storage medium 112); whether a read error and/or timeout was encountered when the portion of the recording medium 103 was accessed (e.g., the portion of the recording medium 103 may be damaged); whether the portion of the recording medium 103 contains invalid data; and the like. As various sectors of the media content are accessed and stored in the storage medium 112, the archival component 105 may update the DAM to indicate that the sectors have been archived and are available for playback from storage medium 112.

Using the DAM, the playback component 106 may determine whether a particular portion (e.g., sector) of the media content of the recording medium 103 is available on the storage medium 112. Similarly, the DAM may be used by the archival component 105 to "fill in" any missing (e.g., un-archived) sectors of the media content item on the storage medium 112. For example, a user may insert a DVD recording medium 103 into the media player 101 and immediately navigate to an ending portion of the media content (e.g., a last chapter of the DVD movie). Similarly, a user may insert a DVD, play a portion of the DVD, and then eject it before the archival component 105 finishes archiving the media content thereon. As described above, during navigation and/or reinsertion of the recording medium 103, the media player 101 may access the DAM associated with the recording medium 103 to determine whether the requested portion has been archived. If not, the media player 101 may direct the archival component 105 to navigate to the requested portion of the recording medium 103, and the content may be archived and made available for playback as described above. The archival of the requested portion of the content may allow the playback component 106 to play the media content from the storage medium 112. After the media player 101 has archived the requested portion of the recording medium (e.g., the "end" of the media content), the archival component 105 may be configured to go back and archive any skipped portions of the content. The skipped (un-archived) portions of the content item may be identified using the DAM. Similarly, if the DAM indicates that read errors were encountered during archival, the archival component 105 may attempt to re-archive those portions of the recording medium 103.

The metadata component 110 of the media player 101 may be configured to receive and associate one or more pieces of data (e.g., metadata) with content items stored in the storage medium 112. The metadata may include descriptive information associated with a respective content item (e.g., metadata 114A may describe the content item 113A, and the metadata 114B may describe the content item 113B). The metadata may include one or more metadata items relating to a content item (e.g., DVD movie, audio track, or the like) and may include, but are not limited to, a title of a content item, a table of contents, a rating, a credits listing, a plot synopsis, one or more graphical assets (e.g., an image of a DVD movie cover, image(s) associated with a scene (which may comprise a reference to such image(s) within the content item), or similar), one or more tags, one or more content item categories, a content item genre, and so on.

The metadata component 110 may receive metadata associated with a content item (e.g., metadata 113A and 113B) from the user 122 via the user interface component 104 (e.g., the user 122 may manually input metadata describing the content). Alternatively, or in addition, the media player 101 may be configured to obtain metadata relating to a content item from a metadata provider 132 accessible via the network 130. The metadata component 110 may be communicatively coupled to the metadata provider 132 via the network 130. In some embodiments, the metadata provider 132 may include and/or be communicatively coupled to a metadata data store 133. The metadata data store 133 may include metadata relating to a plurality of different content items (e.g., DVD movies or the like). Alternatively, or in addition, the media player 101 may include a local metadata data store (not shown) similar to the data store 133, which may include metadata relating to various content item (e.g., DVD movies, music albums, or the like). The local metadata store may be pre-loaded with metadata relating to various content items (e.g., metadata of hundreds or thousands of DVDs, CD, and so on). The local metadata data store may be periodically updated via the network 130, updated via the media reader 122 (e.g., a recording medium 103 may include additional metadata), updated by a removable storage medium, or the like.

To receive metadata information relating to a content item from the metadata provider, the metadata component 101 may generate and transmit metadata query to the metadata provider 132. The query may identify the content item for which metadata is requested. The content item identifier may include, but is not limited to a title of the content, a table of contents, a DVD media identifier, a value derived from one or more identifiers (e.g., a hash value or the like), a combination of identifiers, or other identifying information. The content item identifier may be transmitted to the metadata provider 132 (e.g., in a query for metadata), and may be used by the metadata provider 132 to look up metadata related to the content item in the metadata data store 133. Upon accessing the metadata information, the metadata provider 132 may transmit the information to the metadata component 110 via the network 130.

The metadata component 110 may be configured to store the metadata received from the metadata provider 132 in the storage medium 112. The metadata may be associated with (e.g., linked to) a respective content item in the storage medium 112 (e.g., the metadata 114A may be associated with content item 113A, and metadata 114B may be associated with content item 113B). The association may be made by a database association (e.g., as a table within a database, as a key value, or the like), a data structure association (e.g., within an XML or other structured data format), or the like.

The user interface component 104 may display metadata associated with one or more a content items. For example, the user interface component 104 may display content items 113A-113B stored on the storage medium 112 in a list or other selection interface. Each content item in the list may be displayed in conjunction with one or more pieces of metadata. For example, a DVD movie content item 113A may be displayed using metadata content, such as a graphic of the DVD movie cover, the DVD movie title, a scene from the DVD movie, a DVD movie rating, a plot synopsis, a genre, one or more tags, or the like.

The user interface component 104 may include various different content item display interfaces. For example, the user interface component 104 may include display interfaces that include only content items of a particular genre (e.g., action), a particular rating, or the like. The metadata of the content items 112A-112B stored may be used to determine whether a particular content item should be included in the list.

The metadata 114A and 114B associated with the content items 113A and 113B may allow for sorting and/or searching thereof. For example, a user may search the content items 113A-113B for a particular actor name (e.g., "De Niro"). Responsive to the search, the user interface component 104 may cause a listing of content items having the term "De Niro" in the list of actors to be presented on the display 120. Any search term pertaining to any metadata category and/or type could be used under the teachings of this disclosure.

Figure 2A:
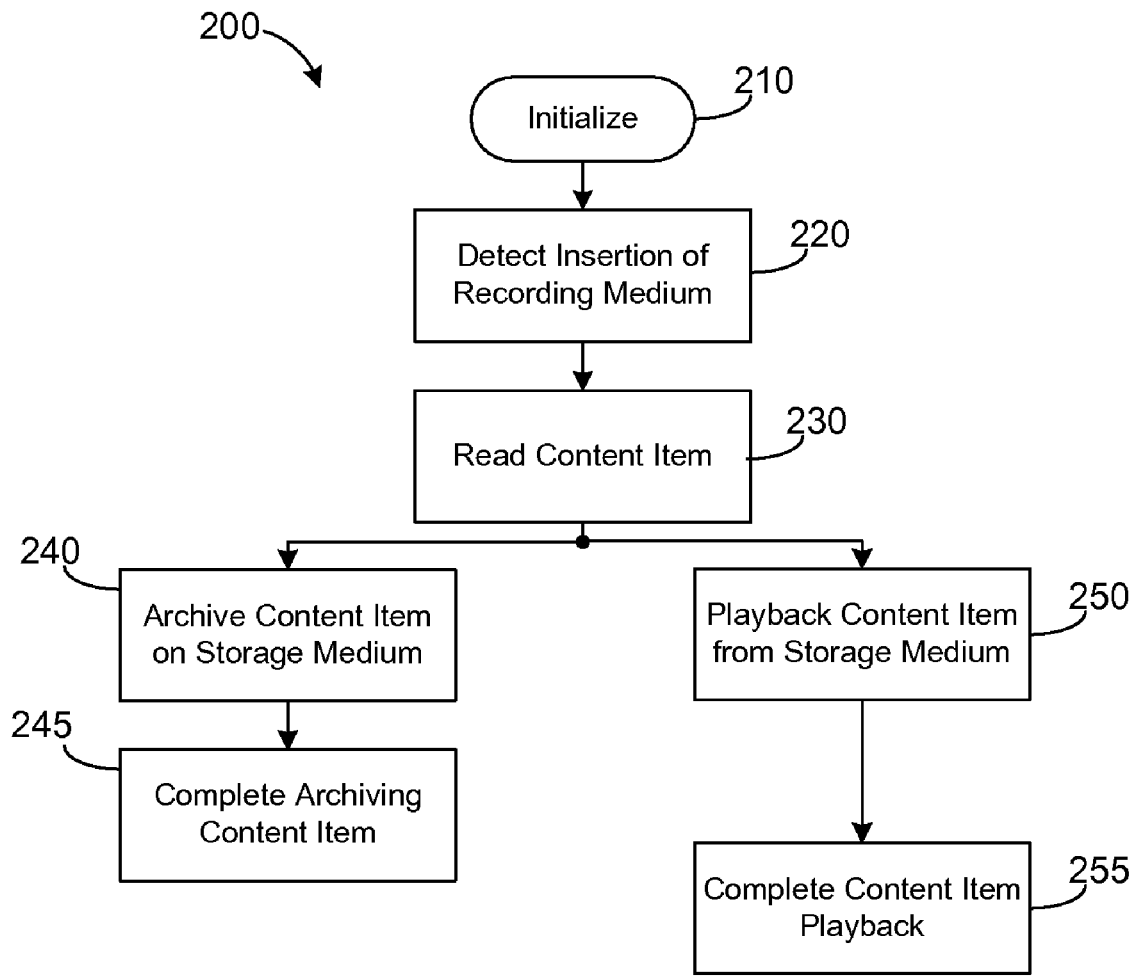
FIG. 2A is a flow chart of a process for archiving and playing media content from a recording medium.

FIG. 2A is a flow chart of one embodiment of a process 200 for concurrently archiving and playing a content item. At step 210, the process 200 may be initialized by allocating and/or initializing required resources, such as memory, storage locations, network connections, device (e.g., a media reader device), and the like.

At step 220, a recording medium may be inserted in a media reader. For instance, the recording medium may include a DVD movie, and the media reader may be a DVD media reader.

At step 230, the process 200 may instruct the reader to begin reading the content from the DVD media at a media read rate. As discussed above, many media readers are capable of reading data at a higher rate than playback speed (e.g., 16× playback speed).

At step 240, media content read from the media reader may be archived in a storage medium.

At step 250, and concurrently with step 240, the media content archived in the storage medium may be accessed and presented on a display. Since, as discussed above, the media reader may be capable of reading data from the media at or above playback speed, the playback of step 250 may occur concurrently with the archiving of step 240.

At step 245, the storage of the content item in a storage medium may complete, and, at step 255, the playback of the content item may complete. As discussed above, since the media reader may be capable of reading media at or above playback speed, the storage of the content item at step 245 may complete before the playback of the content item at step 255.

As discussed above, after archiving the content item on the storage medium, the content item may be made available for subsequent playback. The content item may be played back directly from the archived content in the storage medium and, as such, may not require the recording medium (e.g., DVD disc) to be present in the media reader for playback.

Figure 2B:
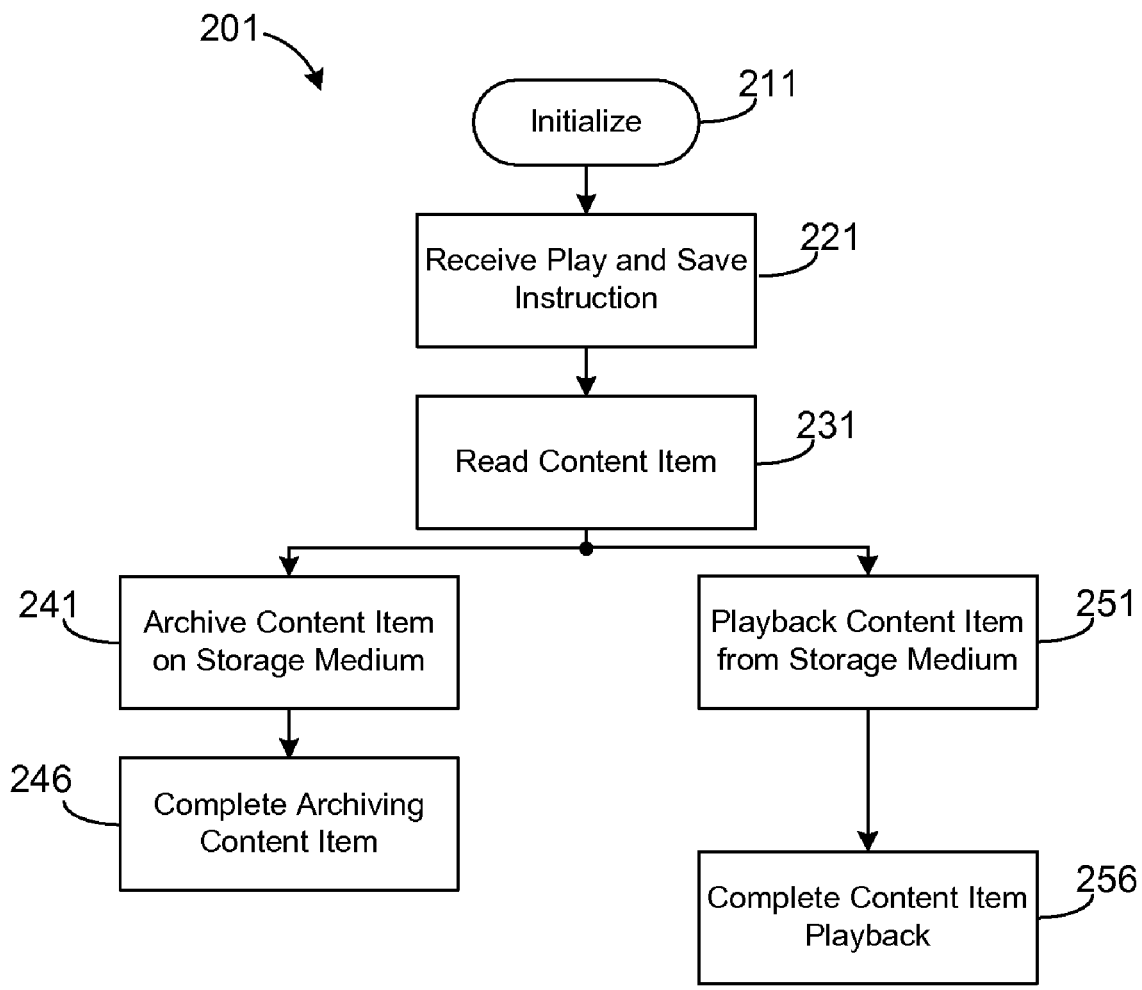
FIG. 2B is a flow chart of another process for archiving and playing media content from a recording medium.

FIG. 2B is a flow chart of another embodiment of a process 201 for concurrently archiving and playing a content item. At step 211, the process 200 may be initialized as described above in conjunction with step 210 of FIG. 2A. At step 221, an instruction to "play and save" a content item stored on a recording medium may be received. The instruction may be received by means of a remote control device, one or more inputs disposed on a surface of a media player, or the like. The play and save instruction may, in a single step, cause the process 201 to concurrently archive and playback a content item stored on a recording medium. The concurrent archival and playback of steps 231-256 may be performed as described above in conjunction with steps 230-255 of FIG. 2A.

Figure 3A:
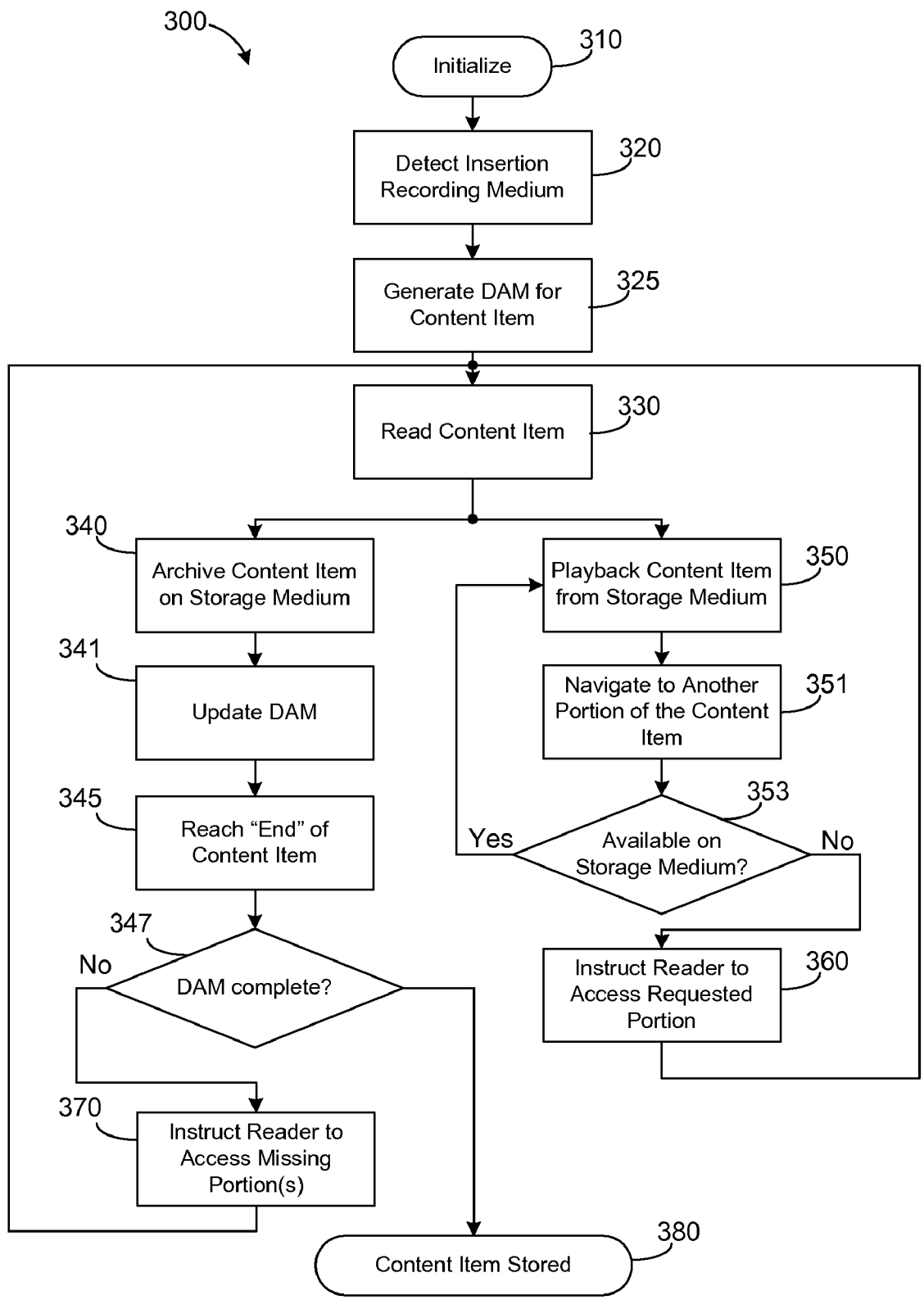
FIG. 3A is a flow chart of a process for tracking the archiving and playback of media content from a recording medium using a data allocation map.

FIG. 3A is a flow chart of one embodiment of a process 300 for concurrently storing and playing back a content item. At steps 310 and 320, the process 300 may be initialized, and a recording medium may be inserted into a media reader as described above.

At step 325, a data allocation map (DAM) may be generated for the content on the recording medium. As described above, the DAM may include a map of the portions of data available on the media (e.g., arranged into sectors, chapters, nodes, or the delimiter types). Each of the portions on the media may be associated with an indicator showing the status of the respective portion. The DAM may support various different indicators including, but not limited an indicator that the portion has been archived (e.g., is stored on a storage medium); an indicator that the portion has been accessed for archiving (e.g., no attempt has yet been made to archive the portion of the recording medium); an indicator the last attempt to access the portion resulted in a read error or timeout; an indicator that the portion of the recording medium comprises invalid data (e.g., as indicated by a media analysis component, such as the component 107 of FIG. 1); and so on. For example, the indicator of a particular portion may be a Boolean and/or bitwise indicator (e.g., bitmask) to reflect one or more of the states discussed above (e.g., a bitwise one (1) may indicate that the portion has been archived, a bitwise zero (0) may indicate that the portion has not been accessed, a two (2) may indicate an error was encountered, and so on).

At steps 330, 340, and 350, the process 300 may direct the media reader to begin reading media content from the media, to archive the media content in a storage medium, and to playback the stored media content as described above.

The archiving of step 340 may take place over time. For example, the media reader may sequentially read portions of the content item from the recording medium. As each portion (e.g., sector, segment, or other delimiter) of the content item on the recording medium is read, it is archived at step 340. If a portion of the recording medium is successfully archived, the DAM may be updated accordingly. If a reading error and/or timeout is encountered, the process 300 may re-try reading the portion a threshold number of times. The read attempt threshold may be adaptable according to the progress of the playback portion of the process 300 (e.g., at steps 350-353 below). For example, if the playback process is occurring in the logical vicinity of the portion, the number of read attempts may be reduced to prevent the attempts from interfering with the playback. Alternatively, if the playback process is not playing back media content in the logical vicinity of the portion, the number of read attempts may be increased since the read attempts are unlikely to interfere with playback.

The archiving of step 340 may be performed in conjunction with a media analysis component, such as the media analysis component 107 of FIG. 1. As discussed above, the media analysis component may walk the recording medium to determine which portions of the recording medium contain valid media data, and which do not. This information may be stored in a graph, a list, or other datastructure describing the structure of the recording medium. As such, at step 340, the process 300 may use the information gathered by the media analysis component to avoid portions of the recording medium that have been marked as containing "invalid data" (e.g., may consult the graph, list, or other data structure before identifying the valid and invalid portions of the recording medium before attempting to archive a portion of the recording medium). Similarly, in other embodiments, at 340 the process 300 may restrict the archiving to only the portions of the recording medium identified by the media analysis component as containing valid media content.

At step 341, the DAM may be updated to reflect the status of the portion of the recording medium. For example, if the portion of the recording medium was successfully archived, the corresponding entry in the DAM may be updated to indicate that the portion is available on the storage medium. If a read error and/or time out was encountered, the DAM may be updated to indicate the error. In some embodiments, the error indicator may indicate the number of attempts made to read the content. Similarly, the DAM may be updated to indicate that a media analysis component determined that the portion contains invalid data.

At step 351, the process 300 may receive an instruction to navigate to another portion of the content item on the recording medium. For example, the process 300 may receive an instruction to navigate to a particular chapter within a DVD movie. The navigation instruction of step 351 may be received from a user of the process 300 via a user interface (e.g., user interface 112 of FIG. 1).

At step 353, the process 300 may determine whether the portion of the media content item requested at step 351 has been archived and is available for playback from the storage medium. The determining of step 353 may include accessing the DAM associated with the content item. If the DAM indicates that the portion could not be archived due to a read error and/or timeout, the portion may be skipped by the playback, and a "next" navigation may be directed to the next "good" portion of the recording medium. The "next" portion may be the following segment of the recording medium and/or a portion linked to the segment in the recording medium. This skipping may cause the playback to jump around the damaged portion of the recording medium. If the requested portion (or next good portion) of the recording medium is available, the flow may continue at step 350 where the process 300 may play the requested portion of the content item from the storage medium. If the requested portion is not available, the flow may continue at step 360.

At step 360, the process 300 may instruct the media reader to access the requested portion of the content item. This may cause the media reader to "skip" to another portion of the recording medium. After navigating to the requested portion of the recording medium, the process 300 may read the content item from the requested position at step 330. The requested portion will be archived at step 340, and the DAM will be updated at step 341. As such, the requested portion of the content item may be played back from the storage medium at step 350 as described above.

At step 345, the media reader may reach an "end" of the content item. At step 347, the DAM may be evaluated to determine whether all of the content item has been archived on the storage medium. As described above, the content item may not be stored sequentially due to user navigation within the content item. As such, the DAM may have one or more gaps. At step 347, the DAM may be accessed to determine whether any portion of the content item has not been archived (e.g., whether any of the entries in the DAM are "FALSE" or zero (0)). If no such portions remain, the content item has been completely archived, and the flow may terminate at step 380.

At step 370, if portions remain to be archived, the process 300 may instruct the media reader to access the un-archived portions of the content item on the recording medium. The missing portions of the recording medium may then be archived in the storage medium at steps 340 and 341, as described above. Since the process 300 plays back the content item from the storage medium, the navigation and archival of steps 370, 340, and 341 may be performed concurrently with playback of the content item without interfering with the playback of the content item.

Figure 3B:
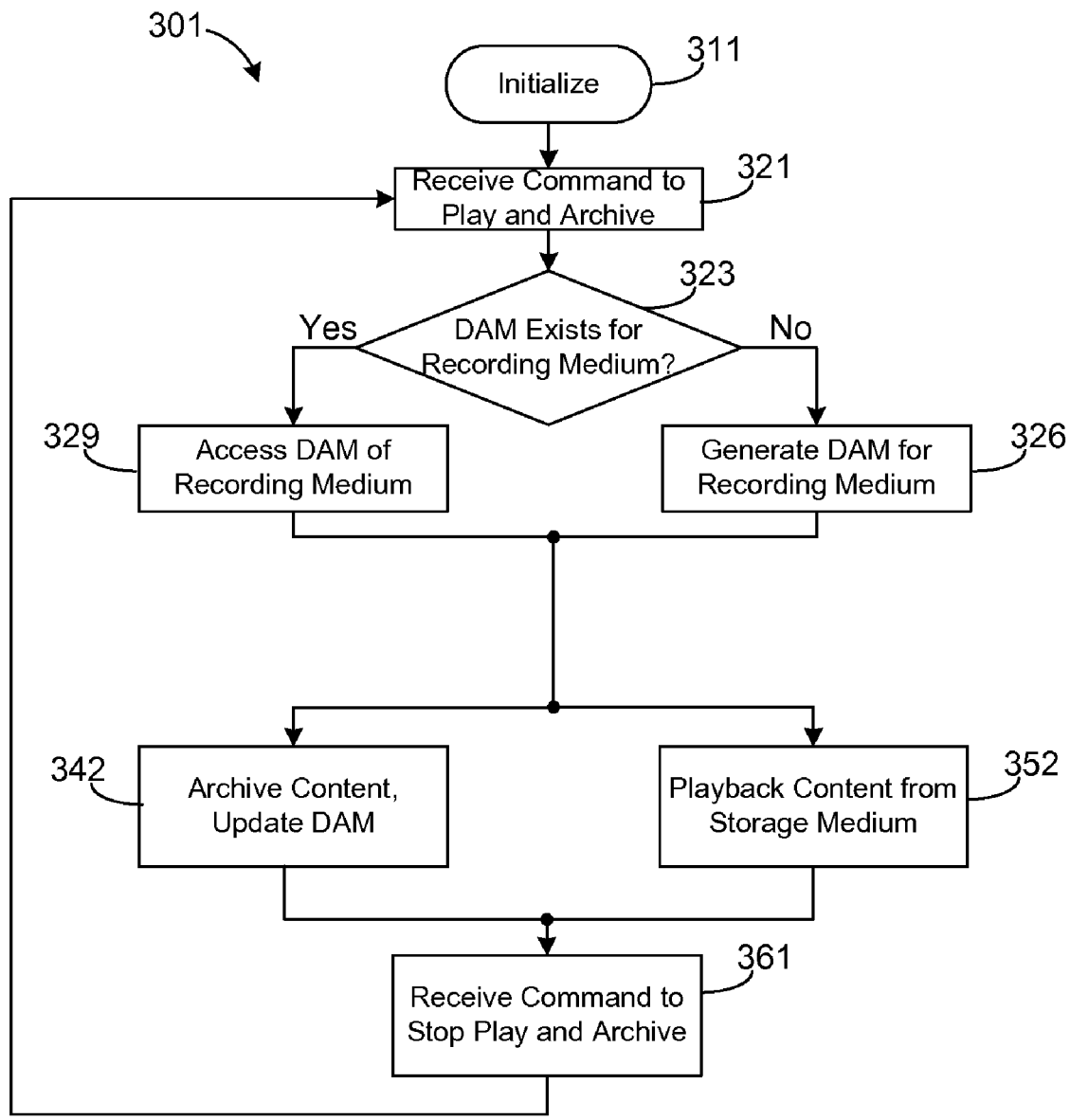
FIG. 3B is a flow chart of a process for tracking the archiving and playback of media content from a recording medium using an allocation map.

FIG. 3B is a flow chart of another embodiment of a process 310 for archiving and playing back media content from a recording medium. At step 311, the process 301 may be initialized as described above.

At step 321, a command to play and archive media content on a recording medium may be received. The command of step 321 may be received via a user interface component (e.g., via a user interface input produced by the user interface component 104 of FIG. 1). Alternatively, or in addition, the command of step 321 may be produced responsive to detecting insertion of a recording medium into a media reader (e.g., detecting the insertion of a DVD disc into a DVD reader of a media player).

At step 323, the process 301 may determine whether a DAM exists for the recording medium in the media reader. In some embodiments, this may comprise generating a recording medium identifier or media content identifier. Examples of various recording medium and/or media content identifiers are provided below in conjunction with FIG. 4. Upon generating the identifier, the process 301 may determine whether a DAM has been associated with the identifier, by querying a storage medium for the DAM using the identifier (e.g., the storage medium 112 of FIG. 1). For example, the storage medium may include a relational database or other data relational system (e.g., search functionality provided by the storage medium). DAM data structured stored on the storage medium may be associated with the identifier (e.g., as a "key" of a database table of the DAM or the like). If a DAM for the recording medium exists, the flow may continue at step 329; otherwise, the flow may continue at step 326.

At step 326, a new DAM may be generated for the recording medium as described above. The DAM may be keyed to a recording medium identifier and stored in a storage medium for subsequent access by the process 301.

At step 329, the existing DAM for the recording medium may be accessed. The existing DAM may indicate that portions of the recording medium have already been archived in the storage medium. As such, the process 301 may not need to re-archive the entire recording medium, rather only those portions of the recording medium which, as indicated by the DAM, have not yet been archived. Similarly, playback of the archived portions of the recording medium may be possible without re-archiving. In addition, the existing DAM may include media analysis information (e.g., a graph or other structure generated by the media analysis component 107 of FIG. 1). The media analysis information may indicate which portions of the recording medium are valid, which contain errors (e.g., scratches), and so on.

At step 342, the process 301 may read content from the recording medium, archive the content in a storage medium, and update the DAM as described above. Also as described above, at step 352, media content may be played back from the storage medium. Although not depicted in FIG. 3B, the reading and archiving of step 342 may navigate to different portions of the recording medium responsive to the playback. For example, a user may request playback of a portion of the recording medium that has not yet been archived. Responsive to such a command, the recording medium may be read and archived at step 342 at the requested location as described above.

At step 361, a command to stop the play and archive process may be received. The command of step 361 may be received via a user interface input. Alternatively, or in addition, the command may be produced responsive to the recording medium being ejected from the media reader.

The command of step 361 may be received before the recording medium has been fully archived (e.g., before all of the media content on the recording medium has been stored on the storage medium). However, the partial archive (and DAM associated therewith) may be maintained on the storage medium. Upon subsequent insertion of the recording medium (or command to play and/or archive the recording medium), the process 301 may pick up where it left off. In some embodiments, the partial archive may be maintained on the storage medium indefinitely. Alternatively, the partial archive may be maintained for a threshold period of time or may be maintained as long as there is sufficient storage space within the storage medium (e.g., after a threshold period of time and/or upon detecting that the storage medium is running low on storage space, the partial archive may be removed). Similarly, a user interface option may allow a user to decide whether and/or how long the partial archive should be maintained. If sufficient media content has been stored, playback of the partially archived media content may be provided as described above.

After receiving the command of step 361, the process 301 may return to step 321 where a command to archive the recording medium may be received. As discussed above, the command of step 321 may be received responsive to detecting insertion (or re-insertion) of the recording medium into the media reader). Similarly, the command of 321 may be received via a user interface component. As shown in FIG. 3B, after receiving the command of step 321, the process 301 may continue the archival of the recording medium where the process 301 left off; the DAM may be detected and accessed at steps 323 and 329. Using the DAM, the process 301 may determine which of the recording medium remain to be archived. In this way, the process 301 may not have to re-archive portions of the recording medium that have already been stored, attempt to archive portions of the recording medium that contain invalid data (e.g., as indicated by a graph or other structured generated by a media analysis component), and so on.

As discussed above, in some embodiments, the DAM indicator of a particular portion of the recording medium may include a plurality of indictors including, but not limited to an "archived" indicator to indicate that the portion has been stored on the storage medium; an un-archived indicator to indicate that the portion has not yet been stored on the storage medium; an indicator that the portion of the storage medium contains invalid data; and/or an "error" indicator to indicate that a read error was encountered during archiving.

In some embodiments, at step 342, the process 301 may ignore portions of the recording having an "error" indicator in the DAM. This may speed up the archiving by preventing attempts at archiving portions of the recording medium thought to be damaged. Alternatively, the process 301 may attempt to archive portions of the recording medium marked with an "error" indicator. This may give the process 301 another attempt at archiving the portion. For example, after stopping the playback and archival process 301 at step 361 (e.g., by ejecting the recording medium and/or receiving a command via a user interface), a user may have attempted to repair the recording medium and/or may have procured a different copy of the recording medium. As such, the portion of the recording medium that caused an error during a previous read attempt, may be successfully read in a subsequent attempt.

Figure 4:
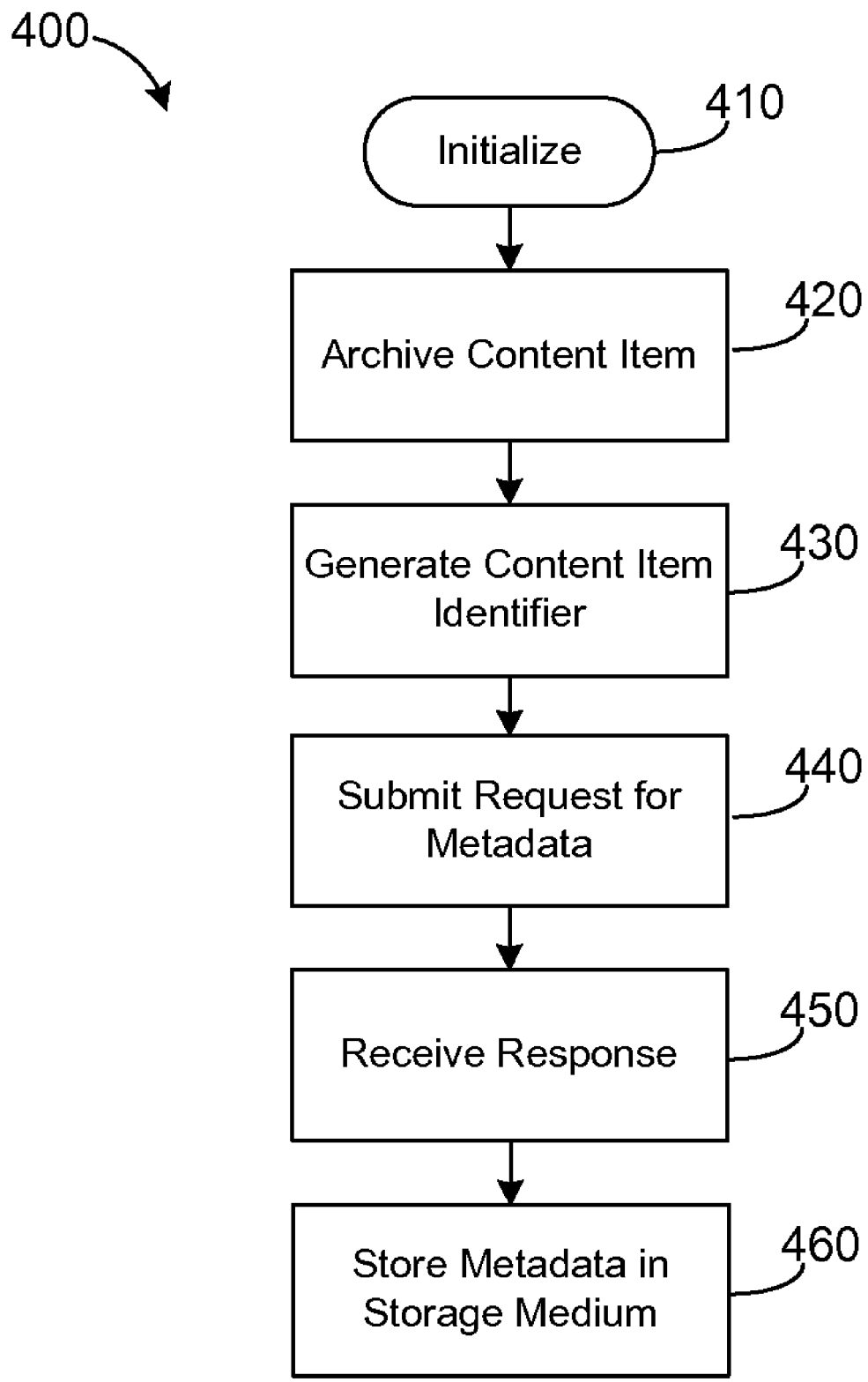
FIG. 4 is a flow chart of a process for acquiring metadata related to media content.

In an alternative embodiment, the media player 101 may access a pre-existing DAM, provided by a metadata provider 132 or other party who may aggregate DAM information, and may use the pre-existing DAM to speed up archival or the recording medium 103 and/or to compare the data on the recording medium 103 to that in the pre-existing DAM. In another embodiment, the media player 101 may transmit the locally generated DAM to a metadata provider 132 or other party who may aggregate DAM information. FIG. 4 is a flow chart of one embodiment of a process 400 for acquiring metadata relating to a content item. At step 410, the process 400 may be initialized as described above.

At step 420, a content item may be archived. The archiving of step 420 may be performed using, for instance, the system 100 of FIG. 1 and/or using a process or processes, such as the processes 200, 201, and/or 300 described above.

At step 430, a content item identifier may be generated. The content item identifier may be a title of the content item, a recording medium identifier, a table of contents of the content item, a partial or complete DAM, a hash value comprising a combination of identifiers, or the like. The identifier may be generated before completion of the archival of the content item. For example, the content item identifier may be generated (and the metadata may be retrieved) upon detecting insertion of the recording media.

At step 440, a request for metadata may be generated and submitted to a metadata provider. The request submitted at step 440 may include the content item identifier generated at step 430. Submitting the request may comprise transmitting the request to a metadata provider over a network. As described above, a metadata provider may receive the request, and, using the content item identifier generated at step 430, may access (e.g., look up) metadata related to the content item in a content item database or other data store.

The metadata provider may transmit a response to the request of step 430. The response may include metadata relating to the content item. The response may be received at step 450. At step 460, the metadata may be stored in a storage medium (e.g., in the storage medium 112 of FIG. 1). The metadata may be associated with the content item in the storage medium (e.g., via a database association, a structural association, or the like).

The metadata associated with the content item may be used to categorize the content item according to a content item genre, rating, or the like. Similarly, the metadata may be searchable. This may allow a user to perform detailed searches for particular types of content items. For example, a user may search for all content items in the "action" genre, having a "PG-13" rating or lower, and so on. Similarly, the metadata may be used in content item listings or other display interfaces. For example, a set (e.g., list) of content items may be presented by displaying metadata associated with each content item in the set. For instance, a set of DVD movie content items may be presented by displaying graphical metadata (e.g., DVD movie cover) and title metadata of the respective content items.

Figure 5A:
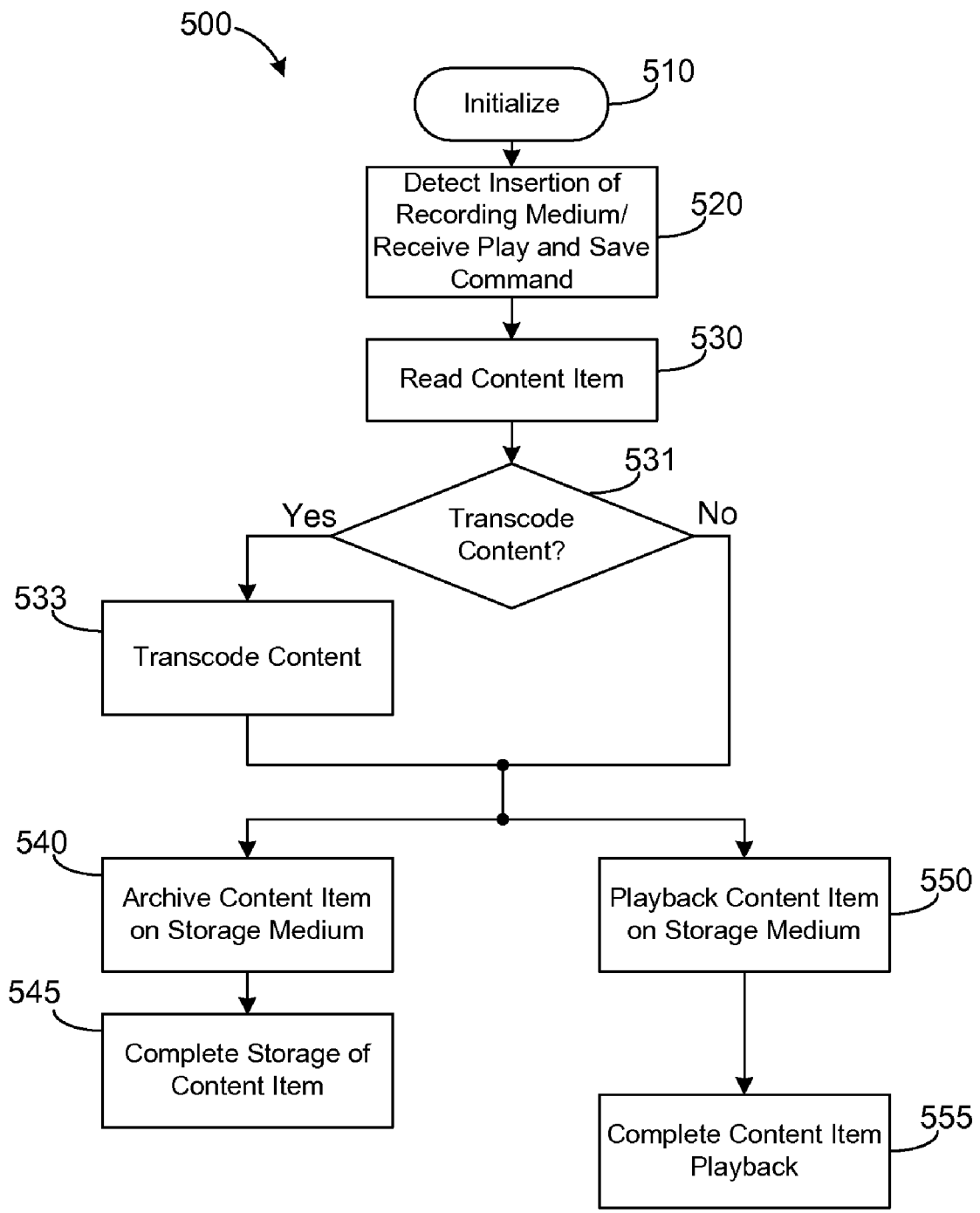
FIG. 5A is a flow chart of a process for transcoding media content for storage on a storage medium.

FIG. 5A is a flow chart of one embodiment of a process 500 for concurrently archiving and playing a content item.

At steps 510, 520, and 530, the process 500 may be initialized (step 510), media may be inserted into a media reader or a play and save command may be received (step 520), and media content may be read therefrom (step 530) as described above.

At step 531, the process 500 may determine whether the media content should be transcoded from a first format (e.g., "native format") in which the content is encoded on the recording media to a second format for archival on the storage medium and/or playback. The process 500 may transcode the media content for various reasons. For example, the content item may be transcoded into a compressed format to reduce the size of the content item on the storage medium. Alternatively, transcoding may be performed into an encoding format adapted for use with dedicated media decoding hardware and/or optimized decoding software. Similarly, the process 500 may be configured to transmit media content to a remote device for display (e.g., to stream the content to a remote display device over a network, such as the Internet). As such, the second format may be a streaming video format and/or a format adapted for use by the remote display (e.g., a codec that the remote display device is capable of rendering, such as RealVideo® or the like). If, at step 531, the process 500 determines that the media content is to be transcoded, the flow may continue at step 533; otherwise, the flow may continue at step 540 and 550.

At step 533, the media content may be transcoded into a second format. The transcoded media content may be stored in the storage medium and/or played back at step 540-555 as described above.

Figure 5B:
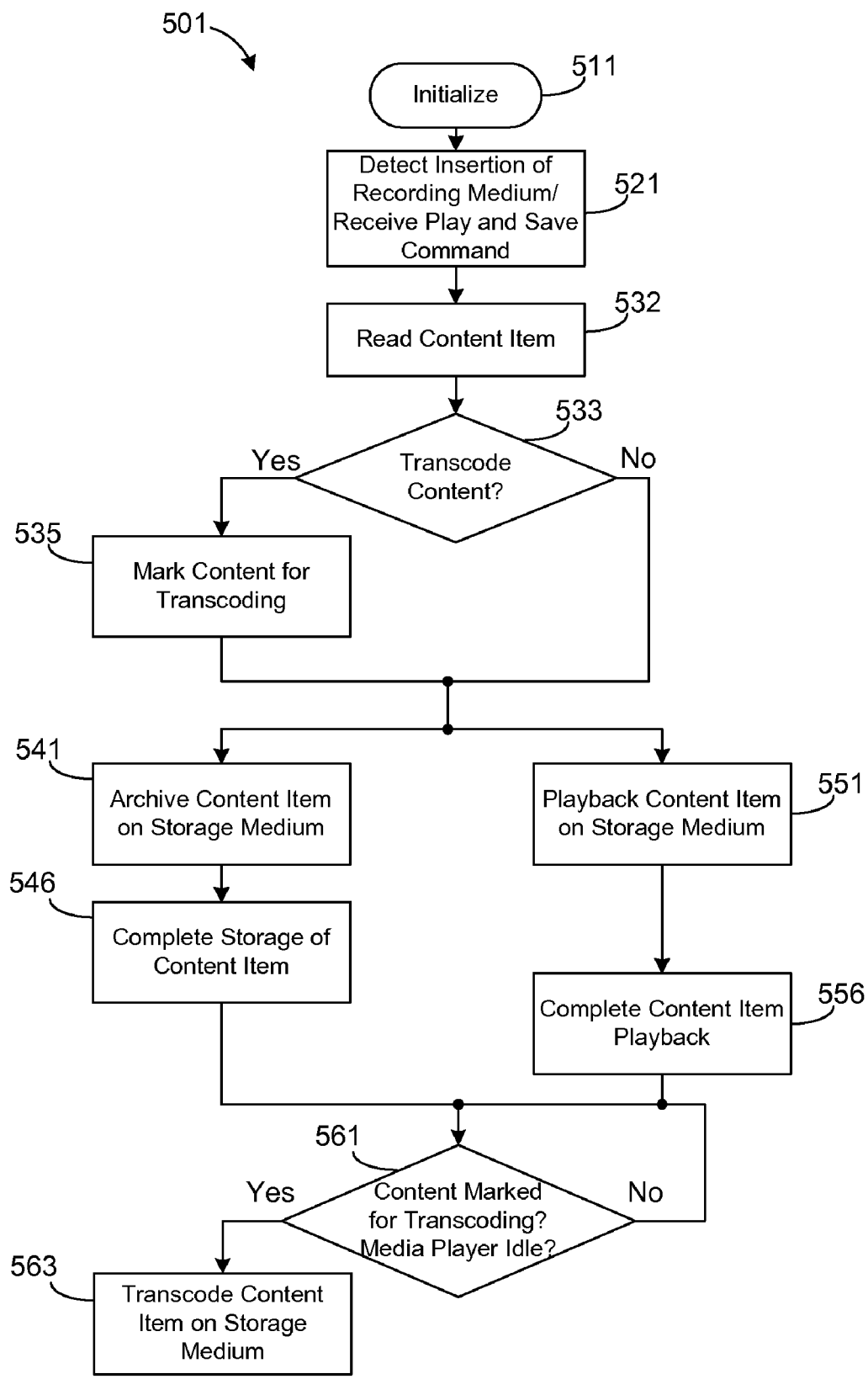
FIG. 5B is a flow chart of a process for transcoding media content stored on a storage medium.

FIG. 5B is a flow chart of another process for transcoding media content on a storage medium. In the FIG. 5B example, the transcoding may not occur in real-time (e.g., as the media content is archived and/or played back). Rather, the transcoding may occur while the media player (or other device on which the process 501 is implemented) is idle. As such, the transcoding (which may take place in software and, as such, require significant processing resources) may not interfere with the normal operation of the media player.

At steps 511, 521, and 532, the process 501 may initialize (step 511), detect insertion of a recording medium and/or receive a play and save command (step 521), and read media content from the recording media (step 532) as described above.

At step 533, the process 501 may determine whether the media content read from the recording medium should be transcoded from a first format (e.g., native format) into a second encoding format. As discussed above, transcoding may be done for various reasons, such as to reduce the size of the content item on the storage medium, to encode the content into an encoding format compatible with decoder hardware and/or software, to adapt the content for transmission over a network, and the like. If at step 533, the process 501 determines that transcoding should occur, the flow may continue at step 535; otherwise, the flow may continue at steps 541 and 551.

In some embodiments, transcoding the media content may not be done at real-time speed, particularly if the transcoding involves transcoding between encoding formats for which the process 501 does not have dedicated hardware (e.g., the transcoding must be done in software). As such, at step 535, the transcoding may not occur in real-time (e.g., as the media content is archived and/or played back to a user). Rather, at step 535, the media content stored on the storage medium may be marked for transcoding at a later time. The marking may comprise storing an indicator (or other data) with the media content on the storage media. The indicator may indicate that the media content should be transcoded when possible and may further indicate the encoding format to which the content should be transcoded (e.g., may indicate the desired encoding format for the media content). This may allow the process 501 to transcode the media content at a later time (e.g., when the process 501 is idle).

At steps 541-556, the media content may be archived and/or played back as described above.

At step 561, after the archiving and/or playback has completed, the process 561 may determine whether the media content is marked for transcoding and whether media player (e.g., or other device on which the process 501 is implemented) has sufficient computing resources to transcode the media content. If processing resources are available (and the content item is marked for transcoding), the flow may continue at step 563; otherwise, the flow may continue at step 561 where the process 501 may continue waiting for an idle condition.

At step 563, the process 501 may transcode the media content item from the first encoding format to a second encoding format. Although not shown in FIG. 5B, the process 501 may monitor the state the media player (or other device on which the process 501 is performed) to determine whether the processing resources used to transcode the media content are needed (e.g., to archive additional recording media, to playback media content, and so on). If the resources are needed, the transcoding of step 563 may be suspended, and the flow may continue at step 561 to resume transcoding the content when the processing resources become available.

Although FIGS. 5A and 5B do not depict the creation of a DAM and/or user navigation within the content item and/or interruption thereof (e.g., as shown in FIGS. 3A and 3B), one skilled in the art would recognize that the transcoding depicted in FIGS. 5A and 5B could be applied to the processes of FIGS. 3A and 3B and vice versa.

Figure 6:
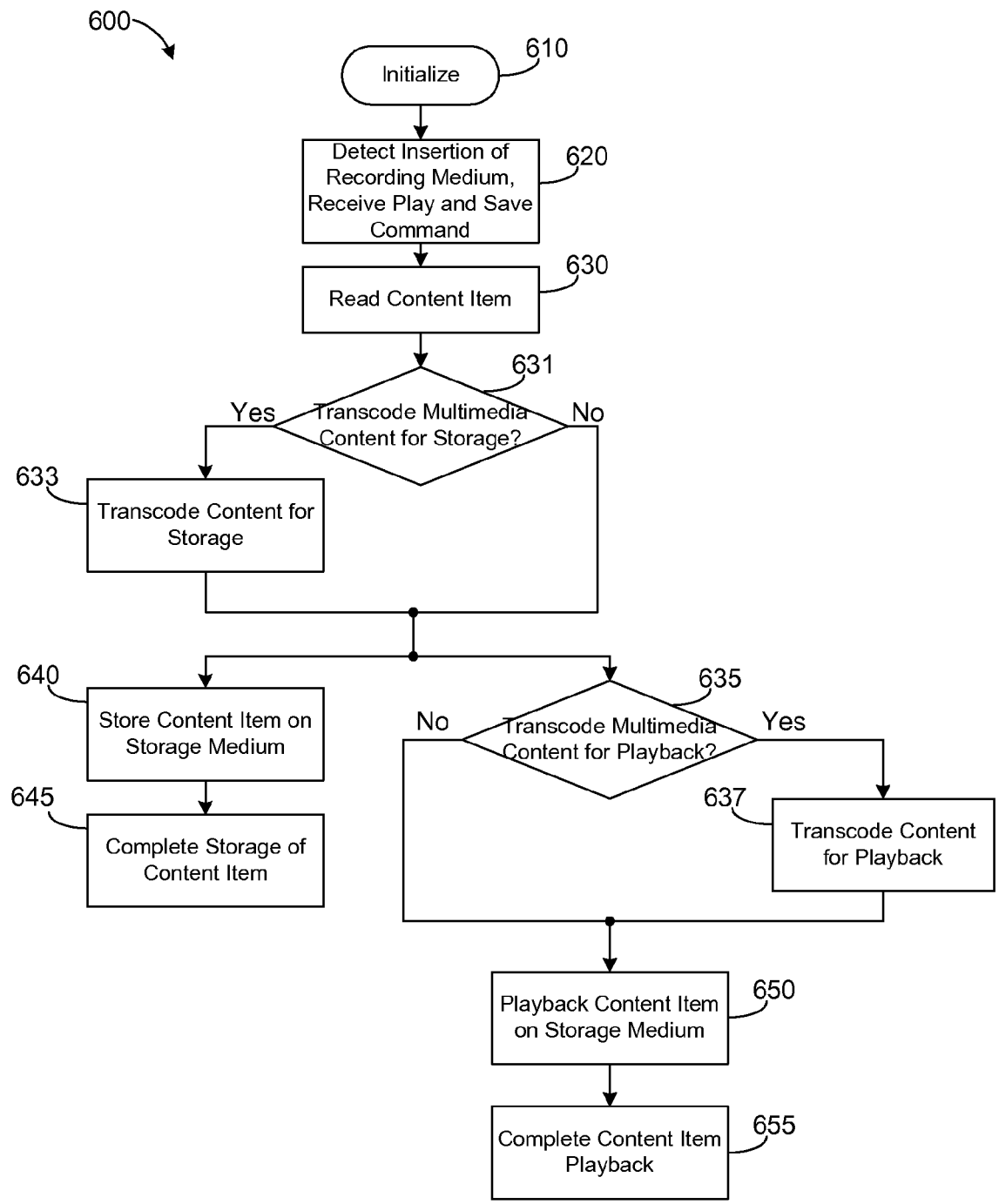
FIG. 6 is a flow chart of a process for transcoding media content for playback on a display device.

FIG. 6 is a flow chart of a process 600 for concurrently storing and playing media content. At steps 610, 620, and 630 the process 600 may be initialized (step 610), detect insertion of media into a media reader or receive a play and save command (step 620), and read media content therefrom (at step 630) as described above.

At step 631, the process 600 may determine whether the media content should be transcoded for storage. As discussed above, there are various reasons media content item may be transcoded including, but not limited to compressing the media content, adapting the media content for playback by specialized hardware and/or software, transcoding the media content into a scalable media format (e.g., an encoding format containing layers which may be combined to improve fidelity), and the like. If the process 600 determines that the content item should be transcoded for storage, the flow may continue to step 633; otherwise, the flow may continue to steps 640 and 635.

At step 633, the media content may be transcoded for storage. At steps 640 and 645, the media content may be stored in the storage medium as described above.

As described above, the media content may be played back concurrently with the storage and/or transcoding of the media content. In some cases, the encoding (e.g., format) used to store the media content may not be optimized for playback. For example, the media content may be played back on a remote display communicatively coupled to the process 600 via a network. The remote display may require that the media content be transcoded into format capable of being transmitted to and/or displayed by the remote client (e.g., a streaming format, such as RealVideo® or the like). However, due to bandwidth considerations, the streaming format may be a relatively low bitrate (and hence of relatively low fidelity). As such, the media content may not be stored in a streaming format. Similarly, the playback device may include specialized decoding hardware and/or software. The media content may be transcoded to optimize playback using the identified hardware and/or software.

Moreover, the media content may be stored on the storage medium in a scrambled (e.g., encrypted) format for security purposes, in a compressed format, or the like. As such, at step 635, the process 600 may determine whether the format in which the media content is stored is compatible with the desired playback of the content. If transcoding for playback is desired, the flow may continue at step 637; otherwise, the flow may continue at step 650.

At step 637, the content may be transcoded into a third format. At step 650, the media content (either transcoded or as read from the storage medium) may be played back. The playback of step 650 may include decoding the media content and causing the media content to be displayed and/or presented to a user. Alternatively, or in addition, the playback may include streaming the content to a remote user over a network, such as the Internet. In this case, the decoding and presentation of the media content may take place on a remote device (e.g., a terminal, computer system, or the like). At step 655, the playback of the content item may be completed as discussed above.

Although FIG. 6 does not depict the creation of a DAM and/or user navigation within the content item (e.g., as shown in FIG. 3), one skilled in art would recognize that the transcoding depicted in FIG. 6 could be applied to the process of FIG. 3 and vice versa.

The above description provides numerous specific details for a thorough understanding of the embodiments described herein. However, those of skill in the art will recognize that one or more of the specific details may be omitted, or other processes, components, or materials may be used. In some cases, operations are not shown or described in detail.

Furthermore, the described features, operations, or characteristics may be combined in any suitable manner in one or more embodiments. It will also be readily understood that the order of the steps or actions of the processes described in connection with the embodiments disclosed may be changed. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product, including a computer-readable medium having stored instructions thereon that may be used to program a computer (or other electronic device) to perform processes described herein. The computer-readable medium may include, but is not limited to hard drives, floppy diskettes, optical discs, CD-ROMs, DVD-ROMs, ROMs, RAMs, EPROMs, EEPROMs, magnetic or optical cards, solid-state memory devices, or other types of media/machine-readable medium suitable for storing electronic instructions.

As used herein, a software module or component may include any type of computer instruction or computer executable code located within a memory device. A software module may, for instance, include one or more physical or logical blocks of computer instructions, which may be organized as a routine, program, object, component, data structure, etc., that perform one or more tasks or implements particular abstract data types.

In certain embodiments, a particular software module may include disparate instructions stored in different locations of a memory device, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of this disclosure.

What is claimed is:

1. A media player for creating a media archive, comprising:
a media reader to read media content from a recording medium inserted into the media reader;
an archival component to store the media content in a storage medium;
a playback component to play back the media content from the storage medium concurrently with the archival of the media content in the storage medium; and
a user interface presented on a display comprising an input to receive a single command to initiate concurrent playback and archival of the media content from the recording medium;
wherein the archival component is to track which portions of the media content have been stored on the storage medium using a data allocation map (DAM) comprising a plurality of indicators, wherein each of the DAM indicators indicates whether a respective portion of the media content has been stored on the storage medium; and
wherein the playback component navigates from a first location in the media content to a second location in the media content, and wherein the playback component is to determine whether the second location in the media content has been stored in the storage medium using the DAM.

2. The media player of claim 1, wherein reading and storing the media content is to commence in response to the recording medium being inserted into the media reader without an explicit user command to store the media content.

3. The media player of claim 1, further comprising a metadata component to retrieve metadata related to the media content from a metadata provider and to store the metadata in the storage medium.

4. The media player of claim 3, wherein the metadata component is to generate a media content item identifier and retrieve the metadata from the metadata provider using the media content item identifier.

5. The media player of claim 3, wherein the metadata component is to provide a search interface through which one or more metadata search terms may be submitted, and wherein the metadata search interface is to return one or more content items having metadata conforming to the submitted search terms.

6. The media player of claim 3, further comprising a user interface component to display a listing of one or more content items available on the storage medium, and wherein each entry in the listing comprises one or more metadata items associated with a respective content item.

7. The media player of claim 6, wherein the metadata associated with the content item comprises a title of the content item.

8. The media player of claim 6, wherein the one or more metadata items associated with the content item comprises a genre of the content item.

9. The media player of claim 6, wherein the one or more metadata items associated with the content item comprises a graphical asset.

10. The media player of claim 6, wherein the user interface includes a single play and save input to produce the single command for playing back and recording the media content.

11. The media player of claim 1, wherein the recording medium is a digital versatile disc.

12. The media player of claim 1, further comprising a transcoder to transcode the media content read from the recording medium from a first encoding format into a second encoding format, and wherein the archival component stores the media content in the storage medium in the second encoding format.

13. The media player of claim 12, wherein the second encoding format has a higher compression ratio than the first encoding format.

14. The media player of claim 13, wherein the first encoding format is not compatible with a hardware decoder within the media player, and wherein the second encoding format is compatible with the hardware decoder.

15. The media player of claim 12, wherein the first encoding format is an encrypted format, and wherein the second encoding format is a decrypted format.

16. The media player of claim 12, wherein the playback component transmits media content for display on a remote display device over a network.

17. The device of claim 13, wherein the transcoder is configured to transcode the media content stored on the storage medium into a streaming encoding format.

18. The device of claim 12, wherein the second encoding format is a scalable encoding format.

19. A method for creating a media archive, comprising:
   reading media content from a recording medium inserted into a media reader;
   archiving the media content in a storage medium, wherein archiving comprises maintaining a data allocation map (DAM) comprising a plurality of indicators, each indicating whether a respective portion of the media content has been archived on the storage medium; and
   playing back the media content from the storage medium concurrently with archiving the media content in the storage medium;
   wherein archiving further comprises tracking which portions of the media content have been stored on the storage medium using a data allocation map (DAM) comprising a plurality of indicators, wherein each of the DAM indicators indicates whether a respective portion of the media content has been stored on the storage medium; and
   wherein playing back further comprises navigating from a first location in the media content to a second location in the media content and determining whether the second location in the media content has been stored in the storage medium using the DAM.

20. The method of claim 19, wherein reading, archiving, and playing back the media content is in response to receiving a single command to play back and archive media content stored on the recording medium.

21. The method of claim 20, wherein the single command is invoked by selection of a specifically designated single input on a user interface.

22. The method of claim 19, wherein reading and archiving the media content is in response to the recording medium being inserted into the media reader without an explicit user command to store the media content.

23. The method of claim 19, further comprising:
   generating a content item identifier to identify the media content read from the recording medium;
   submitting a request for metadata to a metadata provider, the request comprising the content item identifier;
   receiving metadata from the metadata provider; and
   storing the metadata in the storage medium.

24. The method of claim 19, further comprising transcoding the media content read from the recording medium from a first encoding format into a different, second encoding format, wherein the media content is archived on the storage medium in the second encoding format.

25. The method of claim 19, further comprising streaming the media content read from the storage medium to a remote display device over a network.

26. The method of claim 19, further comprising generating a data allocation map for the media content to track which portions of the media content on the recording medium have been archived on the storage medium.

27. The method of claim 26, further comprising updating the data allocation map responsive to archiving a portion of the media content read from the recording medium on the storage medium.

* * * * *